(12) United States Patent
Jung

(10) Patent No.: US 12,587,393 B2
(45) Date of Patent: Mar. 24, 2026

(54) SYSTEM FOR DIAGNOSIS OF A VEHICLE AND METHOD THEREOF

(71) Applicants: Hyundai Motor Company, Seoul (KR); Kia Corporation, Seoul (KR)

(72) Inventor: Ho Jin Jung, Bucheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 260 days.

(21) Appl. No.: 18/133,839

(22) Filed: Apr. 12, 2023

(65) Prior Publication Data

US 2024/0064029 A1 Feb. 22, 2024

(30) Foreign Application Priority Data

Aug. 17, 2022 (KR) ........................ 10-2022-0102808

(51) Int. Cl.
*H04L 9/32* (2006.01)
*G07C 5/08* (2006.01)
(52) U.S. Cl.
CPC .......... *H04L 9/3268* (2013.01); *G07C 5/0808* (2013.01); *G07C 2205/02* (2013.01)
(58) Field of Classification Search
None
See application file for complete search history.

(56) References Cited

U.S. PATENT DOCUMENTS 9,460,567 B2 * 10/2016 Huang ................... H04L 9/0869
2002/0116610 A1 * 8/2002 Holmes ................. H04L 9/3263
713/181

2012/0047289 A1 * 2/2012 Krzystofczyk ....... H04W 12/06
710/10
2014/0279707 A1 * 9/2014 Joshua ............... G06Q 30/0283
701/1
2015/0033016 A1 * 1/2015 Thornton .............. H04L 9/0869
713/171

(Continued)

FOREIGN PATENT DOCUMENTS

WO WO-2008063899 A2 * 5/2008 ............. H04L 9/006
WO WO2017058724 A1 * 4/2017 ............ H04W 12/06

OTHER PUBLICATIONS

R. Kurachi et al., "Evaluation of Security Access Service in Automotive Diagnostic Communication," 2019 IEEE 89th Vehicular Technology Conference (VTC2019-Spring), Kuala Lumpur, Malaysia, 2019, pp. 1-7, doi: 10.1109/VTCSpring.2019.8746714. (Year: 2019).*

*Primary Examiner* — Paul R Fisher
(74) *Attorney, Agent, or Firm* — Fox Rothschild LLP

(57) ABSTRACT

The present disclosure relates to a vehicle diagnostic system and a diagnostic communication method therefor. An exemplary embodiment of the present disclosure provides a vehicle diagnostic system comprising a diagnostic communication device configured to perform diagnostic communication by using a security access service and an authentication service of a standard diagnostic protocol, a controller configured to perform vehicle control, and a diagnotor configured to access the controller through the diagnostic communication device to perform diagnosis. The diagnotor may be configured to perform the authentication service to the diagnostic communication device, and may be configured to perform the security access service to the controller.

16 Claims, 6 Drawing Sheets

(56)                 References Cited

U.S. PATENT DOCUMENTS

2015/0363986 A1*  12/2015  Hoyos ................... H04W 12/08
                                                          340/5.61
2019/0034637 A1*   1/2019  Cho  ........................ H04L 63/08
2019/0281052 A1*   9/2019  Lekkas  ..................... H04L 9/14
2023/0072454 A1*   3/2023  Kulandaivel  ......... H04L 63/168
2024/0045934 A1*   2/2024  Chen .................... H04L 9/3268

* cited by examiner

1st Security with Authentication

2nd Security with Security Access

1

SYSTEM FOR DIAGNOSIS OF A VEHICLE AND METHOD THEREOF

CROSS-REFERENCE TO RELATED APPLICATION(S)

This application claims, under 35 U.S.C. § 119(a), the benefit of Korean Patent Application No. 10-2022-0102808, filed in the Korean Intellectual Property Office on Aug. 17, 2022, the disclosure of which is incorporated herein by reference in its entirety.

BACKGROUND

Technical Field

Embodiments of the present disclosure relate to a vehicle diagnostic system and a diagnostic communication method therefor, and, more particularly, to a vehicle diagnostic communication service technique configured to authenticate a vehicle diagnotor using authentication and securing access services together.

Background

With the development of automobile electromagnetics and the application of modern technologies, the number of controllers available for use in vehicles is increasing. Additionally, in order to inform an external user of information for vehicle diagnostic communications, diagnostic information for an in-vehicle controller is read through various means.

Accordingly, when only one external diagnotor through an OBD-II port is communicated with an internal controller, various off/on board (inside/outside) equipment, such as a telematics service (TMS) and external electric vehicle charging equipment (EVSE), perform diagnostic communication with a vehicle diagnostic communication device.

With advancement of vehicle controllers, security threats (research papers, conferences, etc.) and actual hacking cases are continuously increasing. Among them, a most representative and accessible place is an OBD-II connector positioned under a driver seat of the vehicle, where a gateway in the vehicle is positioned.

It is possible to access the in-vehicle controller and it is possible to request various diagnostic functions through a corresponding gateway (high-speed CAN connection). In diagnostic communication, not only reading of various essential information (such as forced operation, writing controller data, reprogramming, etc.), but also many functions that can harm the controller are applied. A most commonly used security technique to defend against such issues is a security access (27 hex) service of a unified diagnostic service (UDS, ISO-14229-1) international standard diagnostic protocol. However, as the ISO specification was recently revised, a new authentication (29 hex) service for vehicle authentication was added.

When applying the new authentication (29 hex) service to all vehicle controllers mounted in a vehicle, all controllers require secure hardware (ex, HSM, TEE, etc.) to store the key, and it is necessary to develop software for an additional authentication process. As a result, a production cost of the vehicle rises, and a separate system is additionally required to manage it.

The above information disclosed in this Background section is only for enhancement of understanding of the background of the present disclosure, and therefore, it may contain information that does not form the existing technologies that are already known in this country to a person of ordinary skill in the art.

SUMMARY

An exemplary embodiment of the present disclosure has been made in an effort to provide a vehicle diagnostic system capable of increasing security without increasing a cost and a diagnostic communication method thereof by applying an authentication (0x29) service defined in a UDS diagnostic international standard (ISO14229-1) specification only to a gateway, which is an external wired contact, not applying it to all controllers, and applying a security access (0x27) service to remaining internal controllers in a vehicle.

The technical objects of the present disclosure are not limited to the objects mentioned above, and other technical objects not mentioned may be clearly understood by those skilled in the art from the description of the claims.

An exemplary embodiment of the present disclosure provides a vehicle diagnostic system including: a diagnostic communication device configured to perform diagnostic communication by using a security access service and an authentication service of a standard diagnostic protocol; a controller configured to perform vehicle control; and a diagnotor configured to access the controller through the diagnostic communication device to perform diagnosis, wherein the diagnotor is configured to perform the authentication service to the diagnostic communication device, and to perform the security access service to the controller.

In an exemplary embodiment of the present disclosure, the diagnotor may be configured to periodically receive an encrypted certificate from the server.

In an exemplary embodiment of the present disclosure, the diagnotor may be configured to transmit the encrypted certificate to the diagnostic communication device.

In an exemplary embodiment of the present disclosure, the diagnostic communication device may be configured to verify the certificate received from the diagnotor by using a server public key, may be configured to generate a seed by using the certificate, and may be configured to transmit the seed to the diagnotor.

In an exemplary embodiment of the present disclosure, the diagnotor may be configured to encrypt the seed by using a pre-stored diagnotor private key, may be configured to calculate a key value for authentication of the diagnotor by using the encrypted seed, and may be configured to transmit the key value to the diagnostic communication device.

In an exemplary embodiment of the present disclosure, the diagnostic communication device may be configured to verify the key value by extracting a diagnotor public key included in the certificate.

In an exemplary embodiment of the present disclosure, the diagnostic communication device, when verification of the key value is successful, may be configured to notify the diagnotor of the authentication success, and the diagnotor may be configured to be ready for diagnostic communication with all in-vehicle controllers.

In an exemplary embodiment of the present disclosure, the diagnotor, when authentication is successful by performing the authentication service for the diagnostic communication device, may be configured to make a security access service request to the controller.

In an exemplary embodiment of the present disclosure, the controller, when receiving the security access service request, may be configured to generate a seed to transmit it to the diagnotor.

In an exemplary embodiment of the present disclosure, the diagnotor may be configured to generate a key value for authentication of the diagnotor by using the seed received from the controller and to transmit the key value to the controller.

In an exemplary embodiment of the present disclosure, the controller may be configured to generate a key value by using the seed, and to verify the key value received from the diagnotor by comparing the key value received from the diagnotor with a key value generated by itself.

In an exemplary embodiment of the present disclosure, the controller may be configured to generate a key value by using the seed, and to verify the key value received from the diagnotor by comparing the key value received from the diagnotor with a key value generated by itself.

In an exemplary embodiment of the present disclosure, the controller, when verification of the key value received from the diagnotor is successful, may be configured to release security.

In an exemplary embodiment of the present disclosure, the diagnotor, after the authentication service for the diagnostic communication device is completed, may be configured to start the security access service for the controller.

In an exemplary embodiment of the present disclosure, the vehicle diagnostic system may further comprise a server configured to encrypt a certificate for the authentication service by using a server private key and may be configured to periodically transmit the certificate to the diagnotor.

An exemplary embodiment of the present disclosure provides a vehicle diagnostic method. The method may comprise: performing, by a diagnotor, authentication by performing an authentication service of a standard diagnostic protocol to a diagnostic communication device of a vehicle; performing, by the diagnotor, a security access service to a controller of the vehicle to access diagnostic communication when authentication of the diagnostic communication device is successful; and performing, by the diagnotor, diagnostic communication by accessing the controller when security of the controller of the vehicle is released through the security access service.

In an exemplary embodiment of the present disclosure, the performing the authentication may comprise: periodically receiving, by the diagnotor, an encrypted certificate from a server; transmitting, by the diagnotor, the encrypted certificate to the diagnostic communication device; verifying, by the diagnostic communication device, the certificate received from the diagnotor by using a server public key; and generating, by the diagnostic communication device, a seed by using the certificate, and transmitting the seed to the diagnotor.

In an exemplary embodiment of the present disclosure, the performing the authentication may comprise: encrypting, by diagnotor, the seed by using a previously stored diagnotor private key; calculating, by the diagnotor, a key value for authentication of the diagnotor by using the encrypted seed; and transmitting, by the processor, the CAN communication message to the autonomous vehicle.

In an exemplary embodiment of the present disclosure, the performing the authentication may further comprise verifying, by the diagnostic communication device, the key value by extracting a diagnotor public key included in the certificate and; and notifying, by the diagnostic communication device, the diagnotor of authentication success when verification of the key value is successful.

In an exemplary embodiment of the present disclosure, the performing, by the diagnotor, the security access service to the controller of the vehicle to access the diagnostic communication may comprise: requesting, by the diagnotor, a security access service from the controller when authentication is successful by performing the authentication service for the diagnostic communication device; and generating, by the diagnotor, a seed to transmit it to the diagnotor; generating, by the diagnotor, a key value for authentication of the diagnotor by using the seed received from the controller; transmitting, by the diagnotor, the key value to the controller; and verifying, by the controller, the key value received from the diagnotor by generating a key value by using the seed and comparing the key value received from the diagnotor with the key value generated by itself.

According to the present disclosure, it may be possible to increase security without increasing a cost and a diagnostic communication method thereof by performing authentication (0x29) service defined in a UDS diagnostic international standard (ISO14229-1) specification only to a gateway, which is an external wired contact, not performing it to all controllers, and performing security access (0x27) service to remaining internal controllers in a vehicle.

Furthermore, various effects that can be directly or indirectly identified through this document may be provided.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
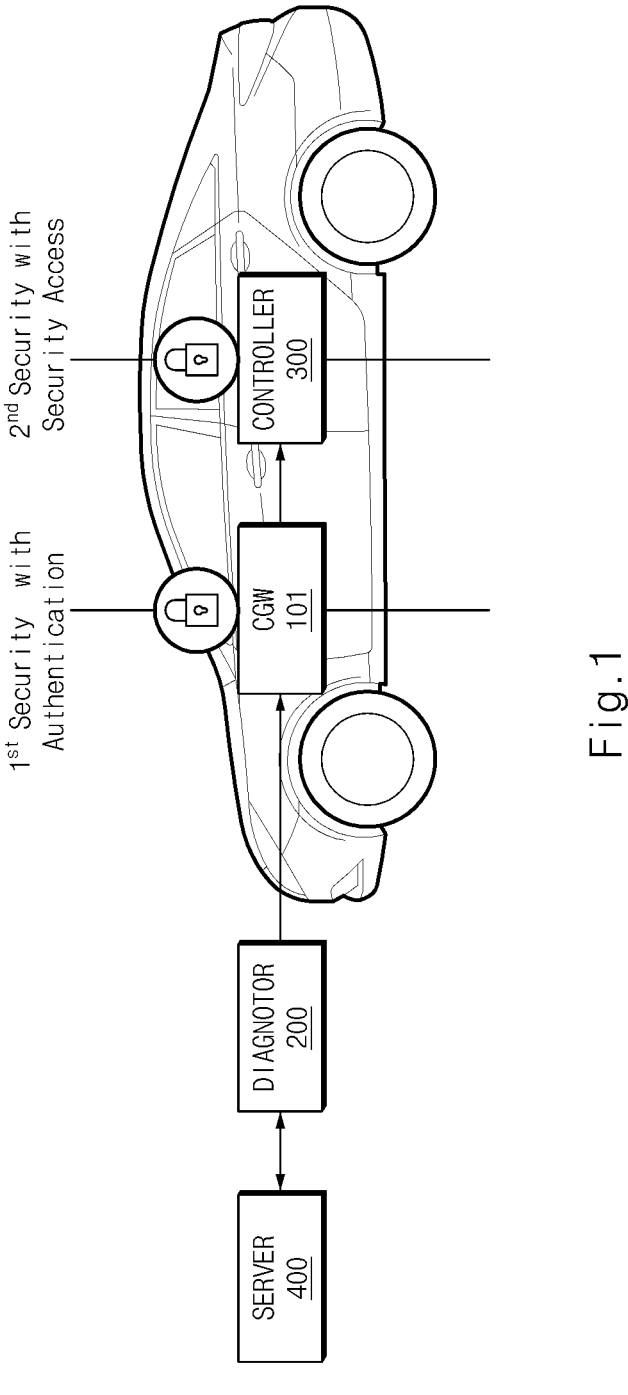
FIG. 1 illustrates a structural diagram of an authentication (0x29) service according to an exemplary embodiment of the present disclosure.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present disclosure, when it is determined that detailed descriptions of related well-known configurations or functions interfere with understanding of the exemplary embodiments of the present disclosure, the detailed descriptions thereof will be omitted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

The present disclosure discloses a structure that applies authentication (0x29) service defined in a UDS diagnostic international standard (ISO14229-1) specification only to a gateway, which is an external wired contact, not performing it to all controllers, and performing security access (0x27) service to remaining internal controllers in a vehicle.

Hereinafter, various exemplary embodiments of the present disclosure will be described in detail with reference to FIG. 1 to FIG. 6.

Figure 2:
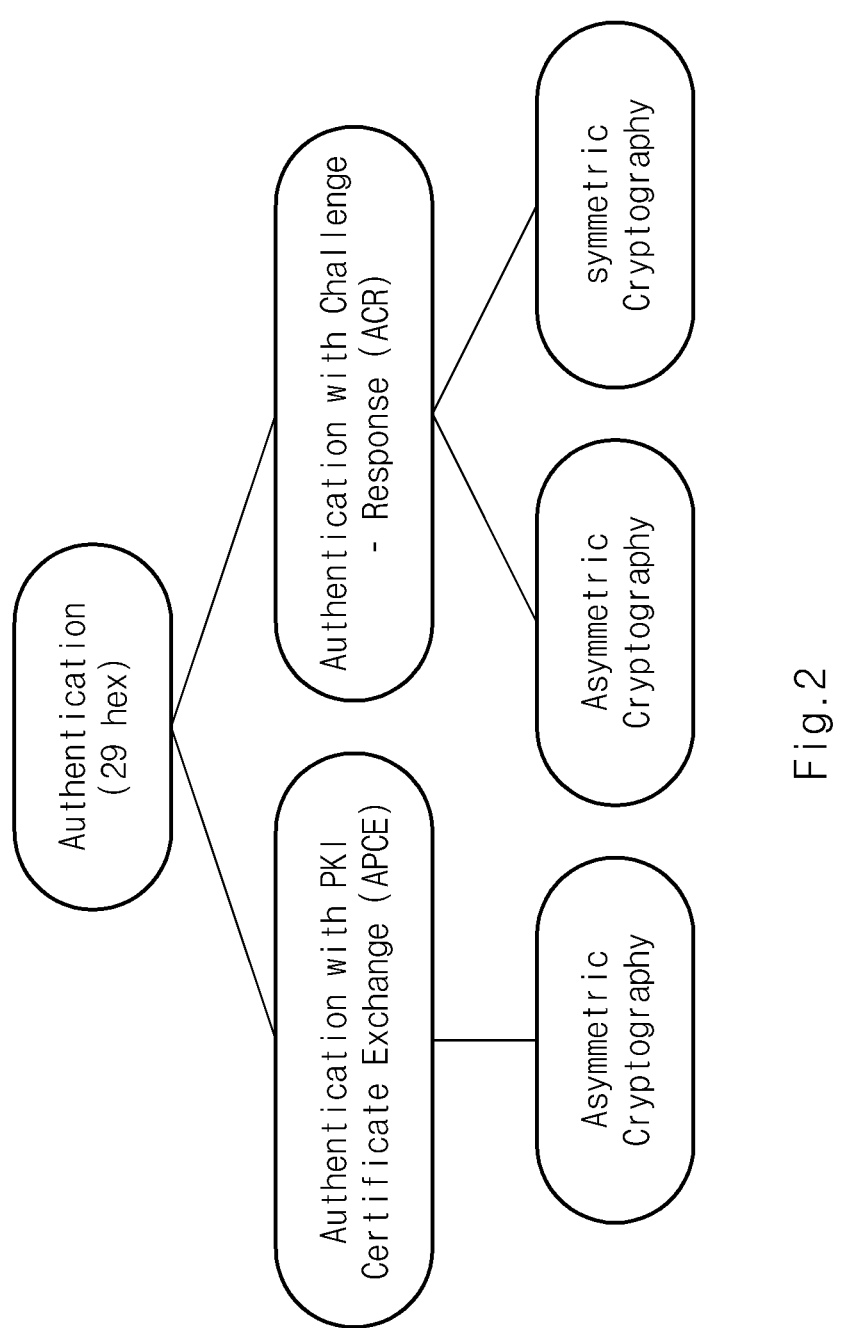
FIG. 2 illustrates a block diagram showing a configuration of a vehicle diagnostic system including a vehicle diagnostic communication apparatus according to an exemplary embodiment of the present disclosure.

FIG. 1 illustrates a structural diagram of an authentication (0x29) service according to an exemplary embodiment of the present disclosure. FIG. 2 illustrates a block diagram showing a configuration of a vehicle diagnostic system including a vehicle diagnostic communication apparatus according to an exemplary embodiment of the present disclosure.

The present disclosure discloses a method for authenticating a diagnotor in a vehicle by appropriately mixing an authentication (0x29) service and a security access (0x27) service defined in a UDS diagnostic international standard (ISO14229-1) specification.

As illustrated in FIG. 1, as the ISO specification is recently revised, a new authentication (29 hex) service for vehicle authentication may be added, and the authentication (29 hex) service may comprise asymmetric encryption after authentication through PKI certificate exchange, asymmetric encryption and symmetric encryption after authentication through a challenge response, and the like.

Referring to FIG. 2, the vehicle diagnostic system according to an exemplary embodiment of the present disclosure includes a device for performing vehicle diagnostic communication, and includes a gateway 101, an external diagnotor 200, an in-vehicle controller 300, and an external server 400.

The external diagnotor 200 may comprise a portable diagnotor for requesting vehicle diagnostic communication from outside the vehicle. The external diagnotor 200 may comprise a communication device, a storage, and a processor. The communication device may be configured to perform communication between the gateway 101 and the in-vehicle controller 100. The storage may be configured to store program instructions executed by the processor. The processor may be configured to process a function of the external diagnotor 200. After authentication through the gateway 101 (diagnostic communication device), the external diagnotor 200 may be configured to perform diagnostic by making secure connection to the in-vehicle controller 300.

After the authentication service for the gateway 101 is completed, the diagnotor 200 may be configured to start a security access service for the controller 300.

The diagnotor 200 may be configured to periodically receive an encrypted certificate from the server 400 and transmit the encrypted certificate to the gateway 101 for an authentication service.

For the authentication service, the diagnotor 200 may be configured to encrypt a seed using a previously stored diagnotor private key, may be configured to calculate a key value for authentication of the diagnotor 200 using the encrypted seed, and may be configured to transmit the key value to the gateway 101.

For a security access service, the diagnotor 200 may be configured to generate a key value for authentication of the diagnotor 200 using the seed received from the controller 300, and may be configured to transmit the key value to the controller 300.

The gateway 101 may be configured to perform communication between the in-vehicle controller 300 and the external diagnotor 200.

The gateway 101 may be configured to verify the certificate received from the diagnotor 200 using a server public key, may be configured to generate a seed using the certificate, and may be configured to transmit the seed to the diagnotor 200.

The gateway 101 extracts a diagnotor public key included in the certificate, may be configured to verify the key value, and may be configured to notify the diagnotor 200 of authentication success when verification of the key value is successful. Accordingly, the diagnotor 200 may be configured to complete preparation for diagnostic communication with all in-vehicle controllers.

The in-vehicle controller 300 may each comprise at least one controller for performing an in-vehicle function. The in-vehicle controller 300 may each comprise in-vehicle electronic control units (ECUs) such as a telematics terminal and an audio video, navigation (AVN).

When receiving a security access service request, the controller 300 may be configured to generate a seed, may be configured to transmit it to the diagnotor 200, and may be configured to generate a key value using the seed.

The controller 300 may be configured to verify the key value received from the diagnotor 200 by comparing the key value received from the diagnotor 200 with a key value generated by itself. That is, the controller 300 may be configured to generate a key value using the seed, and may be configured to compare the key value received from the diagnotor 200 with the key value generated by itself, thereby verifying the key value received from the diagnotor 200.

The controller 300 may be configured to release the security when verification of the key received from the diagnotor 200 is successful.

The external server 400 may be configured to generate a server private key and a server public key, may be configured to store the server private key, and may be configured to transmit the server public key to the gateway 101 of the vehicle. In addition, the external server 400 may be configured to encrypt a certificate (e.g., a PKI certificate) for an authentication service using the server private key, and may be configured to periodically transmit the encrypted certificate to the diagnotor 200.

After the authentication service for the gateway 101 is completed, the diagnotor 200 may be configured to start a security access service for the controller 300.

Accordingly, although the authentication service is applied only to the gateway 101, it is possible to provide the same effect as when the authentication service is applied to all the controllers 300 of the vehicle.

In addition, even when a hacker damages the vehicle and physically accesses an in-vehicle network, the security of the vehicle controller 300 may be maintained by performing a security access service to each controller 300 of the vehicle.

Figure 3:
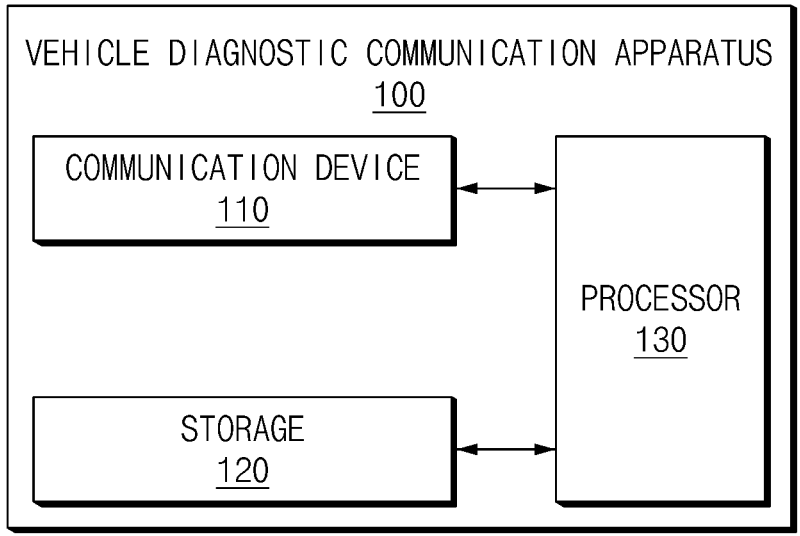
FIG. 3 illustrates a detailed schematic diagram of a vehicle diagnostic communication apparatus according to an exemplary embodiment of the present disclosure.

FIG. 3 illustrates a detailed schematic diagram of a vehicle diagnostic communication apparatus (e.g., a gateway) according to an exemplary embodiment of the present disclosure.

Referring to FIG. 3, the vehicle diagnostic communication device 100 may comprise a communication device 110, a storage 120, and a processor 130.

The communication device 110 may be configured to perform in-vehicle communication through CAN communication, LIN communication, or the like, and may be configured to communicate with the diagnotor 200 and the controller 300.

The storage 120 may be configured to store priority information for processing the diagnostic service of clients. The storage 120 may comprise a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The processor 130 may be electrically connected to the communication device 110, the storage 120, and the like, may be configured to electrically control each component, and may comprise an electrical circuit that executes software commands, thereby performing various data processing and calculations described below.

When receiving a request for an authentication service from the diagnotor 200, the processor 130 performs authentication using a certificate, and when the authentication succeeds, notifies the diagnotor 200 of the authentication success.

That is, the processor 130 may be configured to verify the certificate received from the diagnotor 200 using a server public key, may be configured to generate a seed using the certificate, and then may be configured to transmit the seed to the diagnotor 200.

Accordingly, the processor 130 may be configured to extract the diagnotor public key included in the certificate, may be configured to verify the key value received from the diagnotor 200, and when verification of the key value is successful, may be configured to notify the diagnotor 200 of the authentication success.

As such, according to the present disclosure, it is possible to strength security by performing a new authentication service only to the gateway 101 and a security access service to the in-vehicle controller at a vehicle level.

The new authentication service uses an electronic signature verification method based on the PKI certificate, and to this end, the server may be configured to store the server private key in advance, and the vehicle gateway may be configured to store the server public key in advance. In this case, the diagnotor public key is included in the certificate transferred by the server 400 to the diagnotor 200, there is no need to separately store it.

In addition, the diagnotor 200 periodically receives the certificate from the server 400 as long as a validity period of the certificate does not expire. In this case, an electronic signature encrypted with the server private key should be added to an inside of the certificate to verify the integrity of the certificate, and the certificate should include information related to various certificates as well as the diagnotor public key matching the diagnotor private key. Herein, the private key (server private key, diagnotor private key) must be stored in a secure storage in each of the server 400 and each of the diagnotor 200. The diagnotor private key must also be stored in a secure place through a separate hardware module and cannot be extracted. However, in the case of a public key, it may be stored in a relatively general area, but since it may be tampered with to damage a verification result thereof, a technique for verifying integrity must be applied.

In addition, according to the present disclosure, a private key or secret key is not directly transferred, or essential information is not directly transferred, and thus secure communication is not applied.

All of the internal controllers 300 perform a respective security access logic for each vehicle model or partner company. Most of them may perform a 2-to-5-byte long seed that can fit into one CAN frame, and a security access service may be performed based on a hidden logic that has undergone several calculations. It should be distributed in a secure manner to various field diagnotors in advance during a development step.

Through the above-described preparation step (hereinafter, all steps of FIG. 4), the diagnotor 200 may be ready and configured for diagnostic communication with all the in-vehicle controllers 300.

Figure 4:
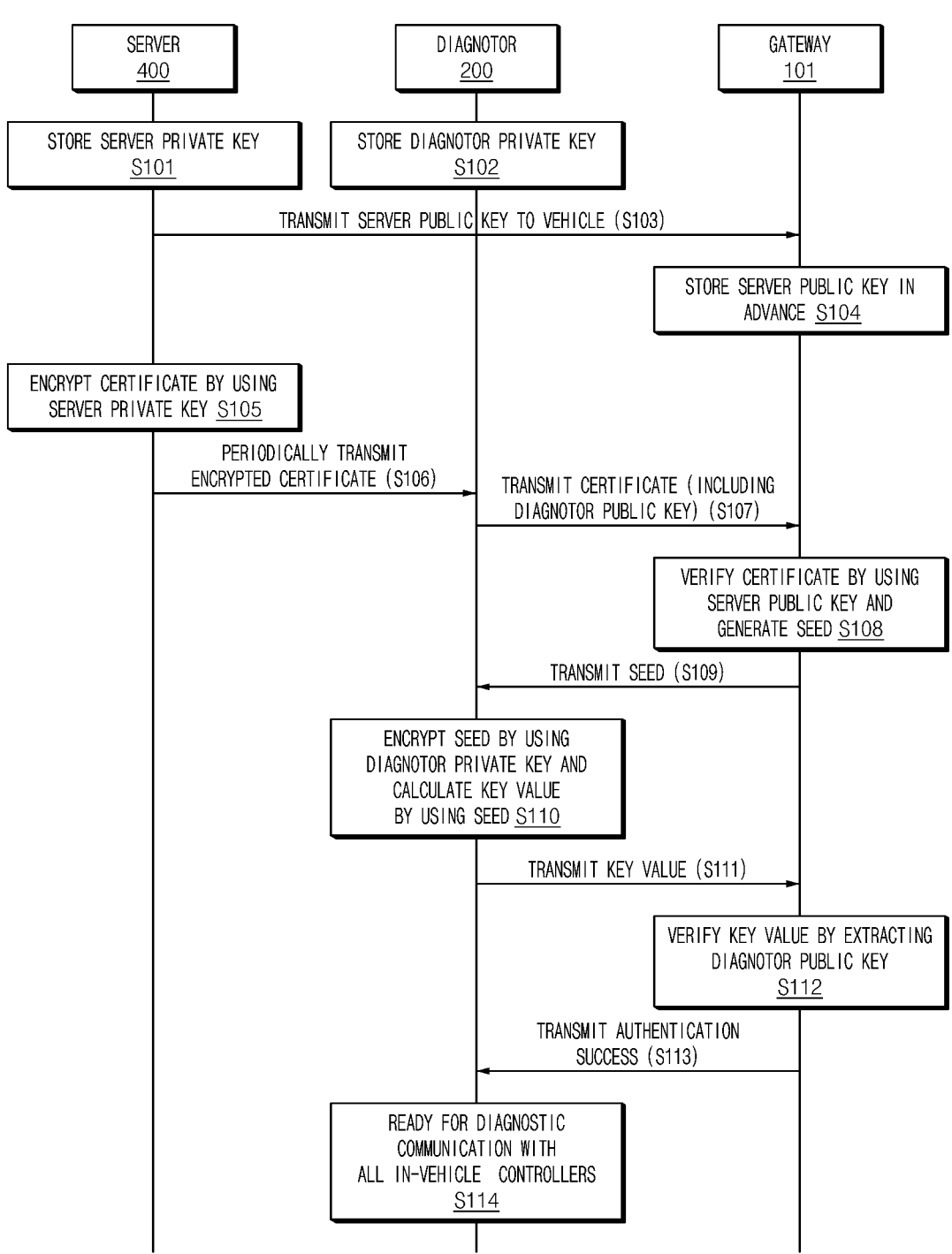
FIG. 4 illustrates a flowchart for describing a vehicle diagnostic communication method according to an exemplary embodiment of the present disclosure.
Figure 5:
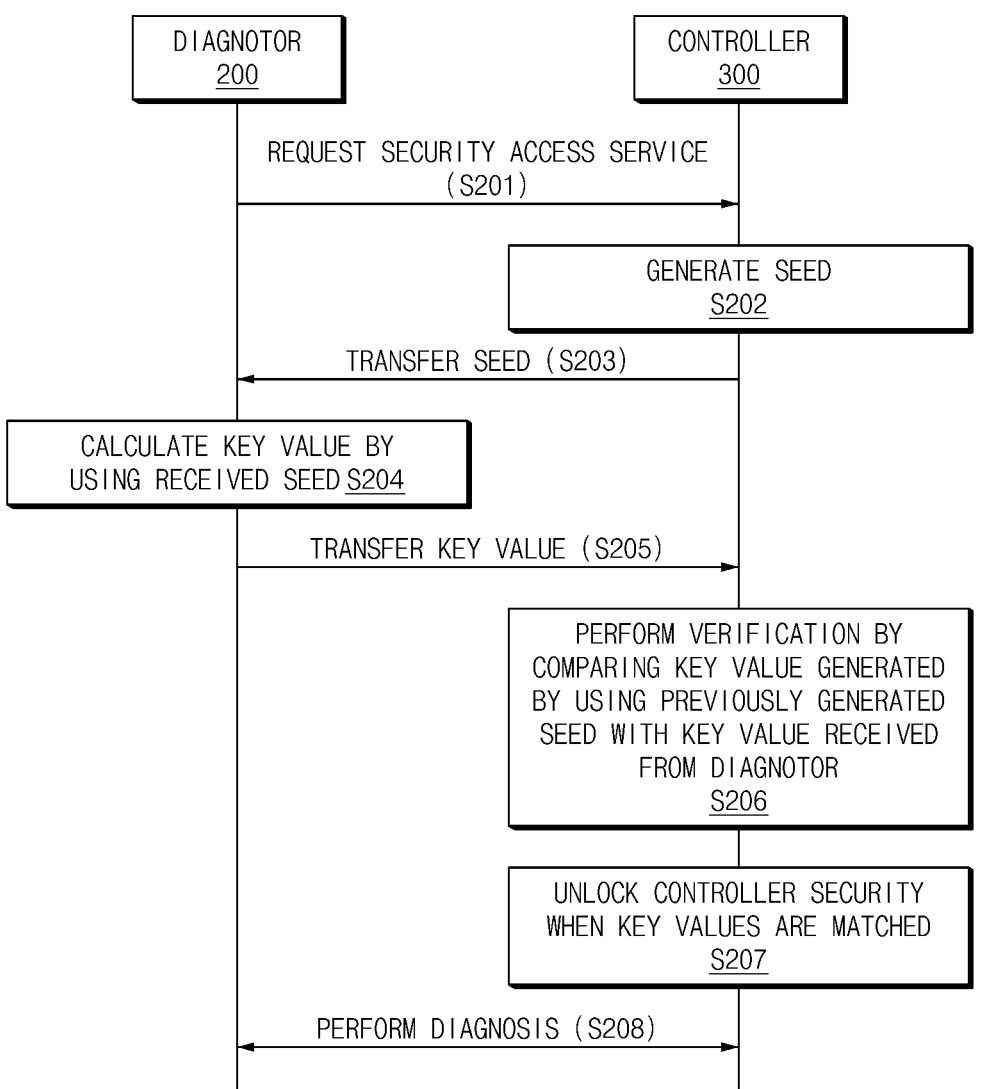
FIG. 5 illustrates a flowchart for describing a vehicle diagnosis communication method according to an exemplary embodiment of the present disclosure.

Hereinafter, a vehicle diagnostic communication method according to an exemplary embodiment of the present disclosure will be described in detail with reference to FIG. 4 and FIG. 5. FIG. 4 and FIG. 5 each illustrate a flowchart for describing a vehicle diagnostic communication method according to an exemplary embodiment of the present disclosure.

Hereinafter, it is assumed that the vehicle diagnostic system of FIG. 2 performs a vehicle diagnostic communication process. A process of performing an authentication service in the gateway 101 will be described with reference to FIG. 4.

Referring to FIG. 4, the server 400 may be configured to store a server private key (S101), and the diagnotor 200 may be configured to store the diagnotor private key (S102).

The server 400 may be configured to transmit the server public key to the gateway 101 of the vehicle (S103), and the gateway 101 may be configured to store the server public key received from the server 400 in advance (S104).

The server 400 encrypts a certificate by using the server private key (S105), and may be configured to periodically transmit the encrypted certificate to the diagnotor 200 (S106).

Then, the diagnotor 200 may be configured to transmit a certificate including a diagnotor public key to the gateway 101 (S107).

The gateway 101 may be configured to verify the certificate received from the diagnotor 200 by using the server public key, and when the certificate is normal, may be configured to generate a seed that is a challenge corresponding to a length thereof (S108). In this case, the seed may be generated as a random number.

Next, the gateway 101 may be configured to transmit the generated seed to the diagnotor 200 (S109).

The diagnotor 200 encrypts the seed received from the gateway 101 by using the stored diagnotor private key, and calculates a key value for authentication by using the seed (S110). In this case, the key value may be generated as a random value.

The diagnotor 200 may be configured to transmit the key value to the gateway 101 (S111). Accordingly, the gateway

101 extracts the diagnotor public key included in the certificate to verify the key value (S112).

When verification of the key value is completed, the gateway 101 notifies the diagnotor 200 that authentication has been successful (S113), and thereafter, the diagnotor 200 may be configured to continuously transmit a Tester Present (3E Service) request to maintain an authentication session with the gateway 101.

Accordingly, the diagnotor 200 is in a state of being ready for diagnostic communication with all the controllers in the vehicle (S114). When the authentication of the gateway 101 is completed, the diagnotor 200 can be routed to the in-vehicle controller 300 so that the controller 300 can be accessed. In this case, the diagnotor 200 performs security authentication for the controller 300 secondarily, and here, a security access (27 hex Service) service is used.

Hereinafter, a process in which the diagnostic device 200 securely accesses the in-vehicle controller 300 will be described with reference to FIG. 5. That is, a process in which the diagnotor 200 performs a security access service with the in-vehicle controller 300 will be described with reference to FIG. 5.

Referring to FIG. 5, the diagnotor 200 requests a security access service from the controller 300 (S201), and the controller 300 generates a seed that is a random number (S202). Accordingly, the controller 300 may be configured to transmit the generated seed to the diagnotor 200 (S203), and the diagnotor 200 calculates a key value by using the seed received from the controller 300 (S204). In this case, the diagnotor 200 sends an initial diagnostic request to the diagnostic target controller 300, and the controller 300 may be configured to transmit the seed to the diagnotor 200 based on a predefined size without separate verification. In addition, the diagnotor 200 may be configured to calculate a key value through a previously shared security access logic (hidden based Algorithm) by using the received seed.

Then, the diagnotor 200 may be configured to transmit the key value to the controller 300 (S205), and the controller 300 compares the key value generated by using the seed generated in step S202 with the key value received from the diagnotor 200 to verify the key value (S206).

When the key value generated by using the seed generated in step S202 matches the key value received from the diagnotor 200, it determines that the verification is successful and security of the controller 300 is unlocked (S207).

Accordingly, the diagnotor 200 accesses the controller 300, and performs diagnostic communication (S208).

As such, according to the present disclosure, an authentication service newly added in a latest revised UDS diagnostic international standard (ISO-14229-1) is applied, and in this case, it is only to the gateway 101, which is an external wired contact, not applied to all vehicle controllers and an existing security access service is applied to remaining internal controllers 300.

As such, a cost of performing the new authentication service to all the vehicle controllers may be reduced by performing the new authentication service at the gateway 101, which is initiation of communication in the vehicle. In addition, according to the present disclosure, even when the new authentication service is applied only to the gateway, an authentication service effect may be provided in all the vehicle controllers. In addition, when the vehicle is partially damaged to physically enter an internal network, the internal controller may be configured to further maintain security by performing the existing security access service as it is.

Figure 6:
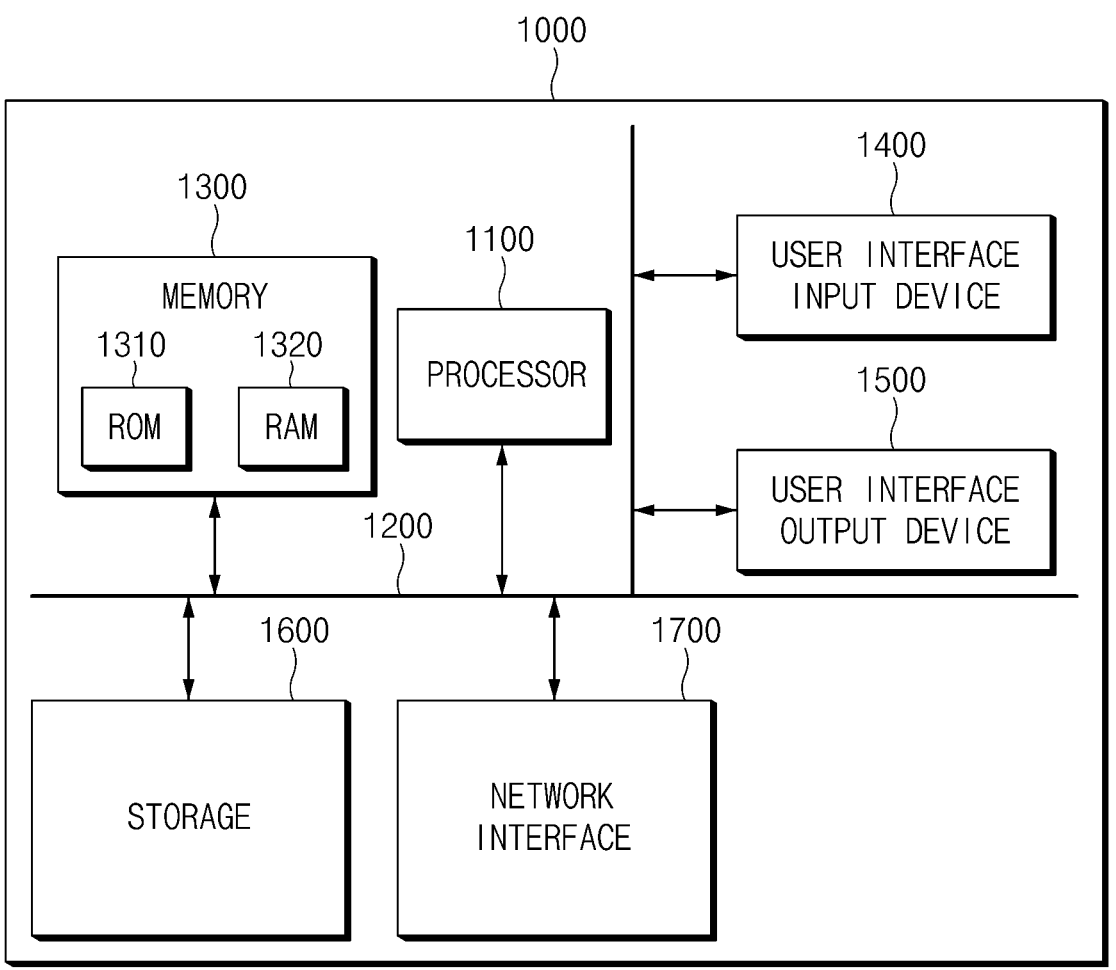
FIG. 6 illustrates a computing system according to an exemplary embodiment of the present disclosure.

FIG. 6 illustrates a computing system according to an exemplary embodiment of the present disclosure.

Referring to FIG. 6, the computing system 1000 includes at least one processor 1100 connected through a bus 1200, a memory 1300, a user interface input device 1400, a user interface output device 1500, and a storage 1600, and a network interface 1700.

The processor 1100 may comprise a central processing unit (CPU) or a semiconductor device that performs processing on commands stored in the memory 1300 and/or the storage 1600. The memory 1300 and the storage 1600 may comprise various types of volatile or nonvolatile storage media. For example, the memory 1300 may comprise a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A vehicle diagnostic system comprising:
   a diagnostic communication device configured to perform diagnostic communication by using a security access service and an authentication service of a standard diagnostic protocol;
   a controller configured to perform vehicle control; and
   a diagnotor configured to:
      access the controller through the diagnostic communication device to perform diagnosis,
      perform the authentication service to the diagnostic communication device; and
      perform the security access service to the controller;
   wherein the diagnotor is further configured to:
      periodically receive an encrypted certificate from a server, wherein the encrypted certificate is encrypted using a server private key stored in the server, and transmit the encrypted certificate including a diagnotor public key to the diagnostic communication device;

wherein the diagnostic communication device is further configured to:
      verify the encrypted certificate received from the diagnotor by using a server public key received from the server,
      generate a seed by using the encrypted certificate, and transmit the seed to the diagnotor; and
   wherein the diagnotor is further configured to:
      encrypt the seed, generating an encrypted seed, by using a pre-stored diagnotor private key; and
      calculate a key value for authentication of the diagnotor by using the encrypted seed.

2. The vehicle diagnostic system of claim 1, wherein the diagnotor is configured to:
   transmit the key value to the diagnostic communication device.

3. The vehicle diagnostic system of claim 2, wherein the diagnostic communication device is configured to verify the key value by extracting the diagnotor public key included in the certificate.

4. The vehicle diagnostic system of claim 3, wherein:
   the diagnostic communication device, when verification of the key value is successful, is configured to notify the diagnotor of an authentication success, and
   the diagnotor is configured to perform diagnostic communication with all in-vehicle controllers.

5. The vehicle diagnostic system of claim 1, wherein the diagnotor, when authentication is successful by performing the authentication service for the diagnostic communication device, is configured to make a security access service request to the controller.

6. The vehicle diagnostic system of claim 5, wherein the controller, when receiving the security access service request, is configured to generate a seed to transmit it to the diagnotor.

7. The vehicle diagnostic system of claim 6, wherein the diagnotor is configured to:
   generate a key value for authentication of the diagnotor by using the seed received from the controller; and
   transmit the key value to the controller.

8. The vehicle diagnostic system of claim 7, wherein controller is configured to:
   generate a key value by using the seed; and
   verify the key value received from the diagnotor by comparing the key value received from the diagnotor with a key value generated by itself.

9. The vehicle diagnostic system of claim 8, wherein the controller, when verification of the key value received from the diagnotor is successful, is configured to release security.

10. The vehicle diagnostic system of claim 1, wherein the diagnotor, after the authentication service for the diagnostic communication device is completed, is configured to start the security access service for the controller.

11. The vehicle diagnostic system of claim 1, wherein the vehicle diagnostic system further comprises a server configured to:
   store a server private key;
   transmit a server public key to the diagnostic communication device;
   encrypt a certificate, generating an encrypted certificate, for the authentication service by using the server private key; and
   periodically transmit the encrypted certificate to the diagnotor.

12. A vehicle diagnostic communication method comprising:

by a diagnotor:

performing authentication by performing an authentication service of a standard diagnostic protocol to a diagnostic communication device of a vehicle;

performing a security access service to a controller of the vehicle to access diagnostic communication when authentication of the diagnostic communication device is successful; and performing diagnostic communication by accessing the controller when security of the controller of the vehicle is released through the security access service;

wherein the performing the authentication comprises:

periodically receiving, by the diagnotor, an encrypted certificate from a server, wherein the encrypted certificate is encrypted using a server private key stored in the server;

transmitting, by the diagnotor, the encrypted certificate including a diagnotor public key to the diagnostic communication device;

verifying, by the diagnostic communication device, the encrypted certificate received from the diagnotor by using a server public key received from the server, generating, by the diagnostic communication device, a seed by using the encrypted certificate; and transmitting the seed to the diagnotor; and wherein the performing the authentication further comprises:

encrypting, by diagnotor, the seed by using a previously stored diagnotor private key, generating an encrypted seed; and calculating by the diagnotor, a key value for authentication of the diagnotor by using the encrypted seed.

13. The vehicle diagnostic communication method of claim 12, wherein the performing the authentication comprises transmitting, by the diagnotor, the key value to the diagnostic communication device.

14. The vehicle diagnostic communication method of claim 13, wherein the performing the authentication comprises:

verifying, by the diagnostic communication device, the key value by extracting the diagnotor public key included in the certificate; and notifying, by the diagnostic communication device, the diagnotor of an authentication success when verification of the key value is successful.

15. The vehicle diagnostic communication method of claim 14, wherein the performing, by the diagnotor, the security access service to the controller of the vehicle to access the diagnostic communication further comprises:

requesting, by the diagnotor, a security access service from the controller when authentication is successful by performing the authentication service for the diagnostic communication device;

generating, by the diagnotor, a seed to transmit it to the diagnotor; and generating, by the diagnotor, a key value for authentication of the diagnotor by using the seed received from the controller.

16. The vehicle diagnostic communication method of claim 15, wherein the performing, by the diagnotor, the security access service to the controller of the vehicle to access the diagnostic communication further comprises:

transmitting, by the diagnotor, the key value to the controller; and verifying, by the controller, the key value received from the diagnotor by:

generating a key value by using the seed; and comparing the key value received from the diagnotor with the key value generated by itself.

* * * * *